(12) United States Patent
Harlos et al.

(10) Patent No.: US 8,950,307 B1
(45) Date of Patent: Feb. 10, 2015

(54) JIG FOR CROSSCUTTING AN ELONGATED WORKPIECE USING SEPARATE SLOTTED GUIDE MEMBERS ON OPPOSING SIDES THEREOF

(71) Applicants: Timothy G. Harlos, Winnipeg (CA); Leonard M. Rivers, Winnipeg (CA)

(72) Inventors: Timothy G. Harlos, Winnipeg (CA); Leonard M. Rivers, Winnipeg (CA)

( * ) Notice: Subject to any disclaimer, the term of this patent is extended or adjusted under 35 U.S.C. 154(b) by 0 days.

(21) Appl. No.: 14/294,288

(22) Filed: Jun. 3, 2014

(51) Int. Cl.
  *B27B 11/04* (2006.01)
  *B26D 7/26* (2006.01)
  *B23Q 9/00* (2006.01)

(52) U.S. Cl.
  CPC ............... *B23Q 9/005* (2013.01); *B27B 11/04* (2013.01)
  USPC ............................................. 83/762; 83/745

(58) Field of Classification Search
  USPC ............ 83/762, 763, 764, 574, 745; 269/1–2, 269/287
  See application file for complete search history.

(56) References Cited

U.S. PATENT DOCUMENTS

| | | | |
|---|---|---|---|
| 789,005 A | 5/1905 | Conkey et al. | |
| 2,559,434 A * | 7/1951 | Hyland | ............................. 33/549 |
| 4,096,777 A * | 6/1978 | Adams | ............................. 83/762 |
| 4,273,016 A | 6/1981 | Murdock | |
| 4,608,898 A | 9/1986 | Volk | |
| 4,685,369 A | 8/1987 | Beamer | |
| 4,718,413 A | 1/1988 | Johnson | |
| 4,889,329 A | 12/1989 | Smith, Jr. | |
| 5,699,711 A | 12/1997 | Gold | |
| 2006/0289085 A1 | 12/2006 | Betts | |

FOREIGN PATENT DOCUMENTS

| | | |
|---|---|---|
| EP | 0101734 | 7/1986 |
| FR | 2148947 | 3/1973 |
| FR | 2975616 | 11/2012 |
| WO | 2006008538 | 1/2006 |
| WO | 2009153602 | 12/2009 |

\* cited by examiner

*Primary Examiner* — Stephen Choi
(74) *Attorney, Agent, or Firm* — Kyle R. Satterthwaite; Ryan W. Dupuis; Ade & Company Inc.

(57) ABSTRACT

A jig for use in cutting an elongate workpiece with a saw blade features separate first and second guide members, each having a respective slot that passes through the guide member on a path spanning along a lengthwise dimension of the guide member. The paths of the respective slots match one another in shape, and a mounting mechanism is operable to secure each guide member in a tightened position abutted against a respective one of two opposing sides of the workpiece. The elongate workpiece is cuttable cross-wise by insertion of the saw blade through the respective slots on the opposing sides of the workpiece and cutting into the workpiece along the path of the slots. The separate guide members can accommodate workpieces of varying size and shape between them while guiding the blade on two sides of the workpiece for optimal reliability and cut accuracy.

17 Claims, 4 Drawing Sheets

JIG FOR CROSSCUTTING AN ELONGATED WORKPIECE USING SEPARATE SLOTTED GUIDE MEMBERS ON OPPOSING SIDES THEREOF

FIELD OF THE INVENTION

The present invention relates generally to jigs useful as guiding guides to cut cross-wise through a fencepost or other elongated workpiece, and more particularly to such a jig which employs two separate guide members that are respectively placed at opposing sides of the workpiece to provide optimum guidance while accommodating varying workpiece dimensions.

BACKGROUND OF THE INVENTION

A known challenge in the fencing industry that wooden fence posts often need to have their top ends cut down after the post is cemented into the ground or otherwise anchored in place, for example to keep uniformity in the relative height of the post in comparison to rails or picket boards of the fence from post to post along the fence line. This trimming of fence posts is sometimes conducted using handheld power tools without any guide means for providing an accurate cut. For example, attempts to cut a flat horizontal top end are often 'eyeballed' without any measurement or marking prior to the cut, often resulting in departure from a true horizontal plane. Even where careful measurement and marking of the desired cutting plane is performed beforehand, wandering of the blade or unsteadiness of the tool operators hand can nonetheless result in deviation from the intended cutting plane.

Further complication arises in that many hand tools lack sufficient blade dimensions to cut fully through the thickness of a typical size fencepost in a single cut. For example, the cutting depth of a handheld circular saw in relation to the fencepost may be insufficient depending on the particular saw and post sizes concerned, thus requiring that the operator cut into the post from multiple sides of the post, and the typical accuracy expected from such cuts will result in a slight offset between the height of the two cuts, resulting in an non-flat finished cut that either needs sanding or other further processing, or leaves an unsightly appearance in the finished fence installation.

U.S. Pat. No. 4,889,329 discloses a prior art post cutting jig intended to address another known problem that since the post are often not truly square (i.e. deviating from precise 90° corners), attempted cuts guided by the post surfaces or by visible cut lines drawn onto the same can also result in deviations from the desired cutting plane. The prior art invention uses four guide members that fasten to one another to form a four-sided jig that closes fully around the fence post, whereby a circular saw can be used to cut partially through the post from multiple sides thereof to eventually cut fully through the post. The top edges of the guide members form a guide along which the fence of the circular saw rides to make a level cut at a distance above the jig. However, the closed nature of this jig (i.e. its full circumference around the post in abutment against all sides thereof when installed) means that the same jig cannot be used on posts of different sizes. Accordingly, a jig purchased by a user can only be employed on posts or lumber of a single predetermined size.

U.S. Patent Application Publication No. 2006/0289085 discloses a guide for cutting elongated workpieces in which a pair of matching templates are fixed together in a face-to-face relationship with one another across an empty space between them, and aligned slots in the two templates provide guide paths for a saw blade. The fixed nature of the connection between the two templates gives the guide a four-sided closed form, which allows easy installation by slipping of the guide over the end of a workpiece and tightening of a screw on one of the templates against the workpiece, but the guide is limited in the size of workpiece on which it can be applied due to the fixed positional relationship between the two templates. In addition, the screw mechanism holds the respective template at a spaced distance outward from the side of the workpiece in the event that the workpiece thickness is notably less than the fixed distance between the two templates, and the tip of the single screw mechanism is the only contact point of the guide on this side of the workpiece. This may potentially lead to relative movement between the workpiece and the guide, and thus potentially reduce the reliability or accuracy of the guide.

PCT Application Publication No. WO2006/008538 teaches another slip-on, closed four sided post-cutting guide with blade-receiving slots in opposing walls or templates of the guide, the design of which is intended for a single predetermined post size, and is incapable of use on a larger post or workpiece.

French Patent Application 2975616 discloses another closed four-sided cutting guide with blade-receiving slots, again having the slot-equipped walls or templates set a fixed predetermined distance apart from one another with no flexibility to accommodate workpieces of greater dimension.

French Patent 2148947 shows another closed four sided cutting guide with slots in opposing walls thereof, but appears to have the slots arranged for cutting longitudinally or axially of the workpiece, rather than for making cross-cuts that transverse the longitudinal axis of the workpiece.

PCT Application Publication No. WO2009/153602 teaches a saw guide in the form of a cutting block having a principle bore for receiving a tubular workpiece to be cut, a sighting bore that opens radially into the principal bore for viewing of a cut-position marker on the tube, and a cutting slot lying axially of the sighting bore and normally of the principle bore. The cutting block closes fully around the principle bore, meaning that the saw guide is of a slip-on type having a fixed maximum size it can accommodate. While the reference does teach that the same unit can be used on smaller sizes, it requires the addition of a bushing of appropriate size in the principle bore in order to maintain a good fit of the guide on the smaller workpiece.

U.S. Pat. No. 4,608,898 discloses a combined protractor and saw guide that defines a track in which the slide plate of a saber saw (also commonly referred to as a jig saw) can run to follow a selected angle of the track that is set using the protractor. The track resides on one side of the workpiece, but there is no further guidance of the blade on the other side of the workpiece. Accordingly, it may be possible for the blade to wander from a true cut. In addition, a conventional saber saw has an insufficient blade length to cut through larger workpieces, such as a 4×4-inch post commonly employed for fence construction. Accordingly, this leads again to the need to cut such a workpiece from multiple sides, making a clean, flat, even cut very difficult to achieve.

Another cutting template that provides guidance on only one side of the workpiece in question is shown in U.S. Pat. No. 4,273,016, but is specifically designed for the purpose of trimming the bottom of a door to lie parallel to a floor with enough clearance for a subsequently added floor covering layer. Accordingly, the cutting template is not well suited to address the needs of a fence post cutting application.

SUMMARY OF THE INVENTION

According to one aspect of the invention there is provided a jig for use in cutting an elongate workpiece with a saw blade, the jig comprising:

a first guide member;

a second guide member that is separate from said first guide member;

each guide member having a respective slot that passes through said guide member on a path spanning along a lengthwise dimension of the guide member, the paths of the respective slots of the first and second guide members matching one another in shape; and a mounting mechanism operable to secure each guide member in a tightened position abutted against a respective one of two opposing sides of the workpiece;

whereby the elongate workpiece cuttable cross-wise by insertion of the saw blade through the respective slots on the opposing sides of the workpiece and cutting into the workpiece along the path of said slots.

Preferably the mounting mechanism comprises a clamping mechanism coupling the first and second guide members together and operable to perform a tightening function drawing the first and second guide members toward one another across a space therebetween;

Preferably the clamping mechanism comprises a pair of clamping devices each disposed adjacent a respective end of the matching shape of the first and second paths.

Preferably the clamping mechanism comprises a screw-type clamping mechanism.

Preferably the screw-type clamping mechanism comprises a bolt and a mating nut, a shaft of the bolt extending from a head of said bolt through a pair of aligned holes in the guide members and the mating nut being threaded onto said shaft.

Preferably the bolt comprises a shouldered area beneath a head of the bolt and a respective one of the pair of aligned openings is shaped for receipt of said straight-sided shoulder in a manner constraining rotation of the bolt by blocking rotation of said shoulder.

Preferably there is provided at least one fastener and at least one respective fastener hole in each of the guide members for engagement of said at least one fastener into the respective side of the post through said at least one fastener hole, for example for individual fastening of each guide member to the post instead of clamping of the guide members to the post with the clamping mechanism.

Preferably the at least one fastener hole of each guide member comprises at least two fastener holes spaced apart along the lengthwise dimension of the guide member.

Preferably each guide member comprises a pair of right angle pieces with first legs of the right angle pieces facing one another in parallel relation in order to define the slot between them, and with second legs of the right angle lying in coplanar relationship with one another to define a flat side of the member for placement against the workpiece.

Preferably the first legs of the right angle pieces of each guide member are attached together at attachment points that are located adjacent opposing ends of the right angle pieces, the attachment points defining respective ends of the slot.

Preferably a length of the slots in the guide members exceeds a value of $W_B + W_P/\cos 45°$, where $W_B$ is a width of the cutting blade and $W_P$ is the width of the elongated workpiece, whereby the guide members can be placed with the slots at any angle between 45° and 90° relative to a longitudinal axis of the elongated workpiece while enabling a cut fully through the workpiece.

According to a second aspect of the invention there is provided a jig for use in cutting an elongate workpiece with a saw blade, the jig comprising:

a first guide member;

a second guide member that is separate from said first guide member;

each guide member having a respective slot that passes through said guide member on a path spanning along a lengthwise dimension of the guide member, the paths of the respective slots of the first and second guide members matching one another in shape; and a clamping mechanism coupling the first and second guide members together and operable to perform a tightening function drawing the first and second guide members toward one another across a space therebetween;

whereby the elongate workpiece is receivable in the space between the guide members and cuttable cross-wise by insertion of the saw blade through the respective slots on the opposing sides of the workpiece and cutting into the workpiece along the path of said slots.

According to a third aspect of the invention there is provided a method of cutting an elongated workpiece, the method comprising:

(a) positioning two separate guide members on respective opposing sides of the elongated workpiece;

(b) temporarily fixing positions of the two separate guide members relative to the elongate member and relative to one another in a manner such that a pair of slots respectively defined in the guide members align with one another across the workpiece in a desired cutting plane in which the elongated workpiece is to be cut; and (c) cutting into the workpiece in the desired cutting plane by inserting a cutting blade of a saw through the pair of slots in an area of said slots spaced outward from the workpiece with a cutting edge of said saw blade facing the workpiece, and reciprocating said saw blade back and forth within the slots against the workpiece and displacing the saw further into the workpiece along the slots.

Step (b) may comprise clamping the guide members together across the elongated workpiece to draw each guide member into abutment against the respective side thereof.

Step (b) may comprise clamping the guide members together adjacent each of two opposing ends of the said guide members.

Step (b) may comprise operating a screw-type clamping mechanism to clamp the guide members together across the elongated workpiece.

Step (b) may comprise tightening of a mating nut and bolt combination of said clamping mechanism through tool engagement of only the nut of said combination, wherein the bolt is constrained against rotation by receipt of a shouldered area of the bolt beneath a head thereof within a cooperatively shaped through hole in a respective one of the guide members that blocks rotation of said shouldered area of the bolt.

Alternatively, step (b) may comprise separately fastening the guide members to the respective side of the elongated workpiece, for example by driving at least one fastener into the workpiece through each guide member at a respective pre-defined fastener hole therein.

Preferably the at least one fastener comprises at least two fasteners each driven through a respective one of a series of fastener holes spaced apart along the respective slot so as to fasten the guide member to the workpiece at spaced apart positions across the width of the workpiece.

The elongate workpiece may be an upright fence post residing in an installed position projecting upward from a ground area at which the fence post is anchored.

According to another aspect of the invention, there is provided a jig for use in cutting an elongate workpiece with a saw blade, the jig comprising:
 a first guide member;
 a second guide member that is separate from said first guide member;
 each guide member being substantially defined by a respective pair of right angle pieces with first legs of the right angle pieces facing one another in parallel relation in order to define a slot therebetween that passes through said guide member on a path spanning along a lengthwise dimension thereof, and with second legs of the right angle pieces lying in coplanar relationship with one another to define a flat inner side of the guide member that faces toward the other guide member;
 a screw-type clamping mechanism comprising:
  two pairs of aligned bolt holes passing through the second legs of the right angle pieces of the guide members, with each pair of aligned bolt holes featuring a respective hole in one of the right angle pieces of each guide member at a location adjacent a respective end of the slot of said guide member;
  a pair of bolts each positioned or positionable to place a threaded shaft of the bolt in a position passing through a respective one of the two pairs of aligned bolt holes; and
  a pair of threaded nuts that are each engaged or engageable on a respective one of the bolts and tightenable against the second leg of one of the right angle pieces through which the respective one of the two pairs of aligned bolt holes passes on an outer side of said second leg that faces away from the other one of the right angle pieces through which the respective one of the two pairs of aligned bolt holes passes, whereby the threaded nuts are tightenable on the pair of bolts to force the first and second guide members toward one another;
 whereby tightening of the of the nuts on the bolts with the first and second guide members disposed on opposing sides of the workpiece acts to clamp the flat inner sides of the first and second guide members flat against the workpiece from the opposing sides thereof to enable cross-wise cutting of the workpiece by insertion of the saw blade through the respective slots on the opposing sides of the workpiece and cutting into the workpiece along the path of said slots.

In one embodiment, the first and second right angle pieces of each guide member are fixed together in a non-movable relationship with one another.

In one embodiment, the second legs of the respective pair of right angle pieces of each guide member define an entire side of said guide member that faces the workpiece when clamped thereagainst.

In one embodiment, the entire side of each guide member that faces the workpiece when clamped thereagainst is defined solely by the flat surface that is defined by the second legs of the respective pair of right angle pieces.

In one embodiment, each of the first and second guide members consists solely of the respective pair of right angle pieces and attachments made between said respective pair of right angle pieces at locations adjacent opposing ends thereof.

In one embodiment, said attachments made between the right angle pieces of each guide member consist of only two attachments, each of which is located adjacent a respective end of the slot, which is void of any other components between said two attachments.

In one embodiment, said attachments are identical to one another.

In one embodiment, each attachment is a respective weld.

In one embodiment, each right angle piece consists solely of a respective piece of angle iron.

According to another aspect of the invention, there is provided a method of cutting an elongated workpiece, the method comprising:
 (a) positioning two separate guide members on respective opposing sides of the elongated workpiece, each guide member being substantially defined by a respective pair of right angle pieces with first legs of the right angle pieces facing one another in parallel relation in order to define a slot therebetween that passes through said guide member on a path spanning along a lengthwise dimension thereof, and with second legs of the right angle pieces lying in coplanar relationship with one another to define a flat side of the member for placement against the workpiece;
 (b) clamping the guide members together across the elongated workpiece in positions aligning the slots with one another in a desired cutting plane by using a screw type clamping mechanism that features a pair of bolts each passing through an aligned pair of bolt holes provided in the second leg of one of the right angle pieces of one of the guide members and the second leg of one of the right angle pieces of the other guide members, including respectively tightening a pair of nuts on the pair of bolts in order to drive each nut against an outer side of the second leg of one of the right angle pieces through which the respective bolt passes in order to draw the guide members together into positions in which the second legs of the right angle pieces of the guide members abut flatly against the opposing sides of the elongated workpiece; and
 (c) cutting into the workpiece in the desired cutting plane by inserting a cutting blade of a saw through the pair of slots in an area of said slots spaced outward from the workpiece with a cutting edge of said saw blade facing the workpiece, and reciprocating said saw blade back and forth within the slots against the workpiece and displacing the saw further into the workpiece along the slots;

In one embodiment, the guide members are supported solely through clamped attachment thereof to the workpiece.

BRIEF DESCRIPTION OF THE DRAWINGS

In the accompanying drawings, which illustrate one or more exemplary embodiments of the present invention.

DETAILED DESCRIPTION

Figure 5:
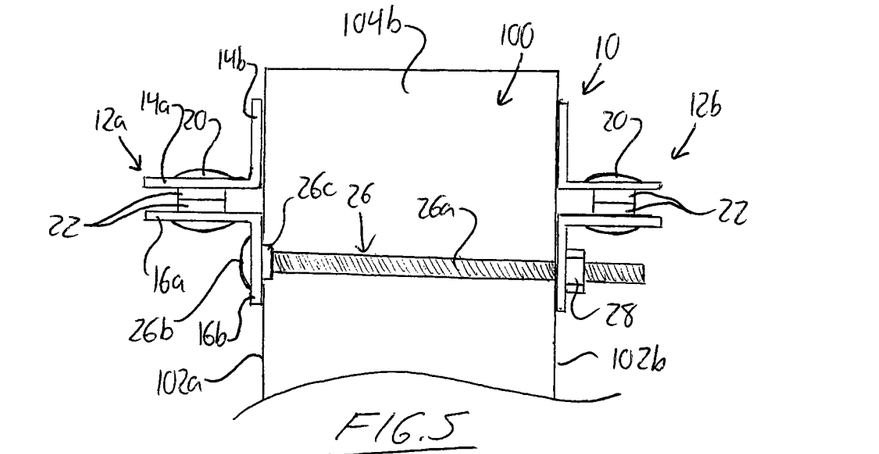
FIG. 5 is an end view of the cutting jig of FIG. 1.
Figure 6:
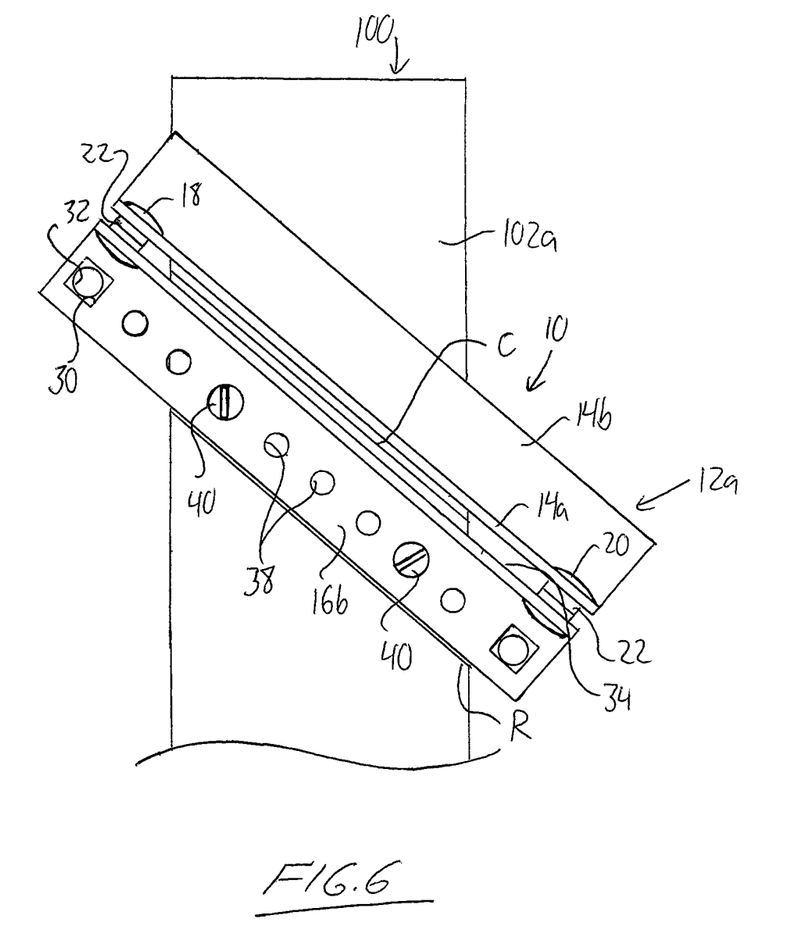
FIG. 6 is a side view similar to FIG. 1 but showing installation of the jig in an obliquely angled position relative to the longitudinal axis of the post, and illustrating an alternate option for temporary mounting of the jig to the post.

FIGS. 1 to 5 illustrate a cutting jig 10 installed on an upright fencepost 100 that has been cemented into or otherwise anchored to the ground to stand upwardly therefrom during installation of a fence. The jig is useful for trimming the top end of the post to a desired elevation so that the top end of the post lies in a desired positional relationship with another part of the fence, for example to place the newly cut top ends of the fenceposts at an equal height from their respective spots of ground to which they are anchored. In FIGS. 1 to 5, the illustrated post has been set in a truly vertical position with its longitudinal axis L lying vertically, and the jig is positioned in a manner placing its length perpendicular to the post axis L so as to the top end of the post in a truly horizontal plane. However, as illustrated in FIG. 6, the jig can also be set at an oblique angle relative to the post axis L, for example for the purpose of cutting a truly horizontal top on a post whose axis is somewhat skewed from vertical over part or all of the post's axial length, or for the purpose of providing an intentionally sloped or angled top to the post, for example for ornamental or other purposes. The jig is capable of being set a wide variety of possible angles relative to the post axis to ensure the effectiveness of the jig in any of a variety of possible post-cutting job requirements.

Figure 3:
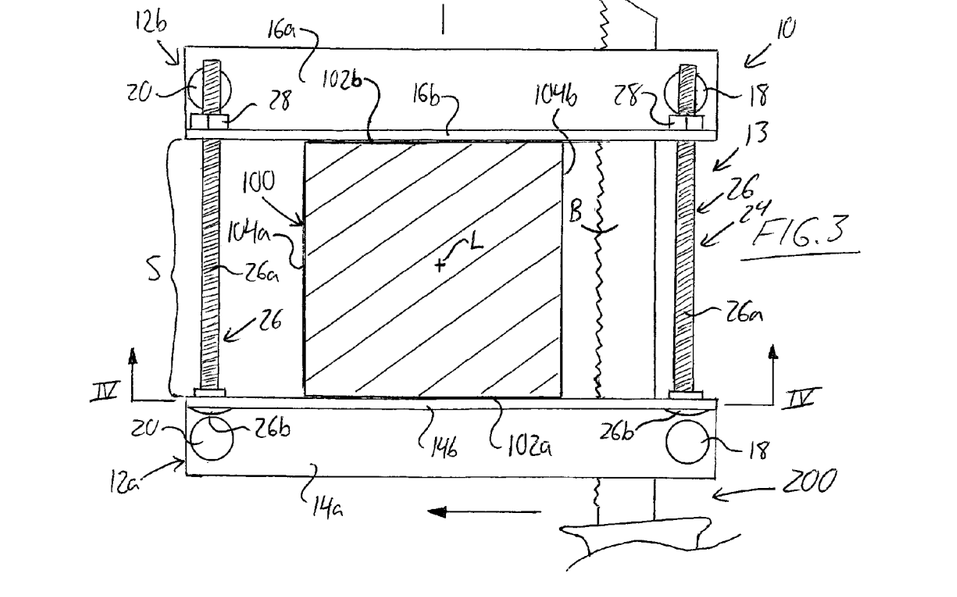
FIG. 3 is a cross-sectional view of the cutting jig and post of FIG. 2 as taken along line III-III thereof, and showing use of a reciprocating saw to cut the post.
Figure 4:
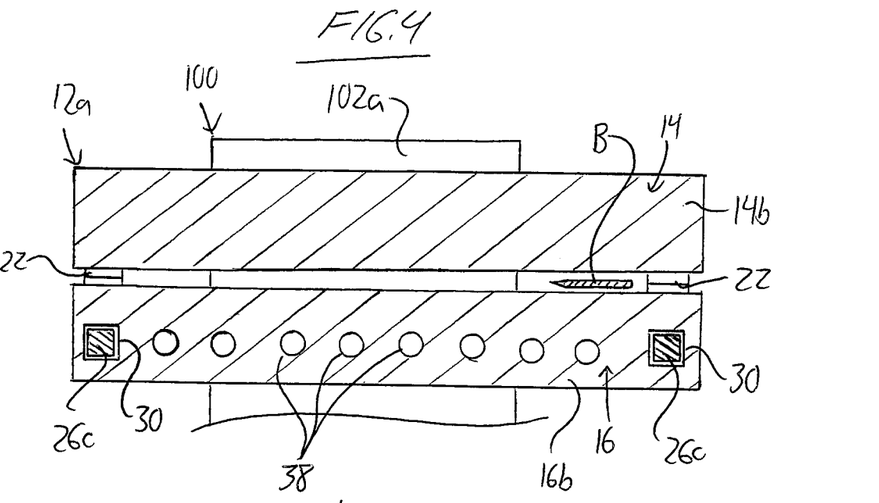
FIG. 4 is a cross-sectional view of the cutting jig and post of FIG. 3 as taken along line IV-IV.

The jig 10 features two separate guide members 12a, 12b and a clamping mechanism 13 that interconnects the two guide members across an empty space S that resides between the guide members 12a, 12b during use. As best shown in FIGS. 3 and 5, the jig is installed on the post 100 by placing each of the guide members 12a, 12b against a respective one of two opposing sides 102a, 102b of the post, and then using the clamping mechanism to draw the two guide members together, thus tightly abutting each guide member against the respective side face 102a, 102b of the post and thereby frictionally supporting the jig on the post. The illustrated post has a square cross-section in planes lying normal to its longitudinal axis L, as such square posts are commonly employed for fence posts. However, it will be appreciated that the jig may be used on workpieces of other shapes that also having parallel opposing side faces against which the two guide members may be placed, for example on workpieces of non-equilateral rectangular section. Although disclosed in the context of cutting wooden fenceposts of solid cross-section, the jig may be used on elongated workpieces of other materials, with solid or hollow cross-sections.

Each guide member 12a, 12b features a respective pair of angle-irons or similar right-angle pieces 14, 16 that are attached together with their longitudinal axes or lengthwise dimensions lying parallel to one another. The relative position, orientation and fastening between the two angle irons is the same for each guide member, and accordingly further description of these features is described only once to avoid redundant description of like features of the other guide member. When the jig is placed in the useful position on an upright post, one of these angle irons defines a top angle iron 14 of the two that resides over a bottom angle iron 16 of the two.

A first leg 14a of the top angle iron 14 lies parallel to and faces toward a corresponding first leg 16a of the bottom angle iron 16 in alignment therewith. When the guide member is positioned to make a horizontal cut, the longitudinal axis of each angle iron lies horizontally, as do these first legs 14a, 16a of the guide members, as best shown in FIG. 5. With reference to this same horizontal-cut orientation of the jig shown in FIGS. 1 to 5, a second leg 14b of the top angle iron 14 stands vertically upright from the first leg 14a of the top angle iron 14 in coplanar relationship with a second leg 16b of the bottom angle iron 16, which depends vertically downward from the first leg 16a of the bottom angle iron 16.

The two angle irons 14, 16 of each guide member 12a, 12b are fastened or fixed together in these relative positions, for example by a pair of rivets 18, 20 fastened through the facing-together first legs 14a, 16a of the angle irons 14, 16 at positions located adjacent respective ends of the equal length shared by the two angle irons. A uniform gap separates the first legs 14a, 16a over the length and width thereof, for example as provided by one or more washers 22 or other annular spacers disposed around each rivet 18, 20 in the space between the first legs 14a, 16a of the angle irons 14, 16. This gap likewise separates the second legs 14b, 16b of the angle irons 14, 16 that extend away from one another in a parallel manner in a plane that is perpendicular to the planes of the parallel first legs 14a, 16a. Lying coplanar to one another, the second legs 14b, 16b define a flat side of the guide member that faces in a direction opposite to that in which the first legs 14a, 14b perpendicularly jut from the second legs. This flat side gets placed flush against the respective side 102a, 102b of the post 100 during installation of the jig 10. It will be appreciated that fixing together of the two angle irons may be accomplished by means other than rivets, for example by way of welding or threaded fasteners.

The clamping mechanism that connects the two guide members 12a, 12b together is also operable to draw the guide members toward one another into a clamping condition against the opposing sides 102a, 102b of the post 100. The illustrated clamping mechanism features two identical clamping devices 24, each disposed adjacent a respective end of the guide members 12a, 12b. Each clamping device 24 features a carriage bolt 26 and mating nut 28. The threaded shaft 26a of the carriage bolt is passes through a square hole 30 in the second leg 16b of the lower angle iron 16 of the first guide member 12a near the respective end thereof, and continues onward through a corresponding hole 32 in the second leg 16b of the lower angle iron 16 of the second guide member 12b. The alignment of the square hole 30 in the first guide member 12a with the corresponding hole 32 in the second guide member 12b can be seen in FIG. 6, in which the carriage bolts have been removed. The nut 28 threads onto the shaft 26a of the carriage bolt 26 after insertion of same through the aligned holes in the two guide members 12a, 12b.

Advancement of the nut 28 further onto the bolt shaft 26a toward the bolt head 26b pushes the nut against the face of the second leg 16b of the lower angle iron 16 of the second guide member 12b on the outer side of the second leg from which the first leg projects, thereby driving the second guide member toward the first guide member. Prior to installation of the jig 10 onto the post 100, the nuts are engaged on the bolts only far enough toward the bolt heads 26b so as to leave an open space S between the facing-together flat sides of the guide members 12a, 12b. This space S exceeds the depth of the post, as measured between the opposing sides 102a, 102b of the post against which the guide members 12a, 12b are to be positioned. The distance measured between the two carriage bolts 26 along the length directions of the guide member angle irons exceeds the width of the post, as measured between the other two parallel sides thereof. Accordingly, an open area bound between the facing-together flat sides of the guide members 12a, 12b and the two carriage bolts 26 exceeds the cross-sectional area of the post 100 in planes normal to its longitudinal axis L.

As a result, this open area can be slipped over the top end of the post 100 in order to situate the jig 10 in a position closing around the post, with the two guide members 12a, 12b located respectively on opposing sides thereof. The gap between the two angle irons 14, 16 of each guide member 12a, 12b defines a respective slot 34 having a depth that passes through the guide member from the free distal ends of the first legs 14a, 16a furthest from the second legs 14b, 16b to the opposing flat side of the guide member facing toward the other guide member. A length of the slot is measured between the spacers 22 near the two opposing ends of the guide member in a direction parallel to the longitudinal axes of the angle irons. The gap size or slot thickness (i.e. the perpendicular distance between the two facing-together first legs 14a, 16a of the angle irons 14, 16) exceeds the thickness of the blade B of a reciprocating saw 200 that is to be used to cut the post, whereby the saw blade B can be inserted through the slot from the opening between the free distal ends of the parallel first legs 14a, 16a and onward through the opening between the coplanar second legs 14b, 16b of the same guide member. The saw blade can be displaced lengthwise along the slot between the spacers 22, which define closed ends of the slot past which the saw blade cannot pass in the lengthwise direction of the slot.

Before the saw is inserted into the jig in this manner via one of its two slots, the jig must first be temporarily secured to the post in a position placing the two slots 34 in the plane P of a desired cut through the post. To identify such a position, preferably suitable measurement and marking steps are taken on the post prior to slipping the jig onto the post. Preferably, a user would measure the desired height to which the post is to be cut, and optionally may mark this height with a cut line C, and then calculate a compensated height by subtracting an offset dimension D from the measured height. The offset dimension is measured on either of the two guide members from the plane of the first leg 16a of the bottom angle iron 16 to the distal lower edge of the second leg 16b of the lower angle iron that lies furthest from the first leg. A guide or reference line R is then marked on the post at the compensated height. If the desired cutting plane P is horizontal, a level may be used to draw this cut line. Alternatively, a steel square, carpenter's square or the like can be used to mark the cut line perpendicularly to the plane of an adjacent side of the post, but this may be less preferable for a desired horizontal cut, as this cut line will deviate from horizontal if the adjacent side of the post is not truly vertical.

Figure 1:
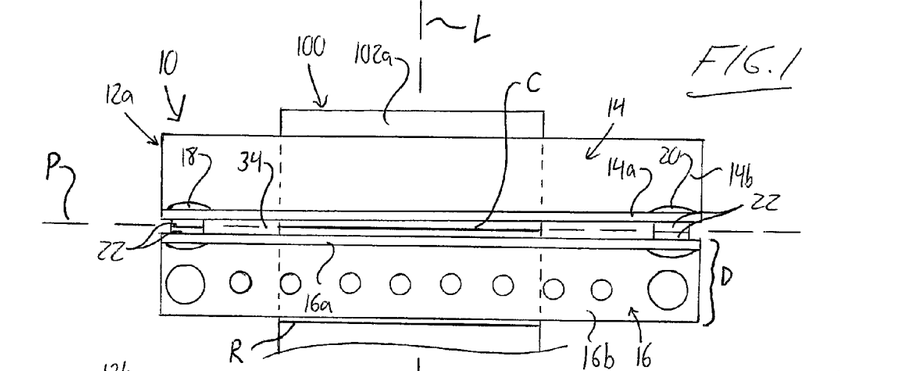
FIG. 1 is a first side view of a cutting jig of the present invention installed on a square fence post in a horizontal position for horizontally trimming the top end thereof.
Figure 2:
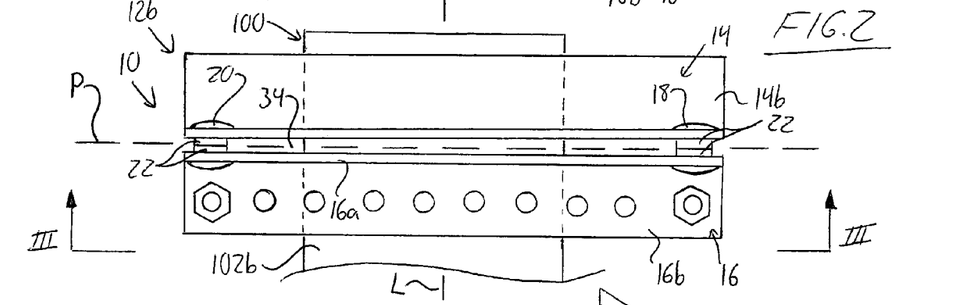
FIG. 2 is a second side view of the cutting jig and post of FIG. 1 from an opposing side thereof.

With reference to FIG. 1, with the reference line R drawn at the offset distance D below the desired cutting plane P marked by cut line C, placement of the guide member 12a against the marked side 102a of the post 100 with the distal bottom edge of the second leg 16b of the lower angle iron 16 positioned at the reference line R places the slot 34 in line with the cut line C. With the guide member 12a held in this position, the nuts 28 of the clamping mechanism are tightened on the carriage bolts 26 using a wrench or socket, thus drawing the other guide member 12b toward the one manually held in place at the reference line R. This tightening continues until the two guide members clamp tightly against the opposing sides 102a, 102b and secure the jig in place, thereby freeing up both hands of the user.

The square hole 30 in the first guide member is sized to accommodate receipt of the squared shoulder 26c of the respective carriage bolt 26 that underlies the head 26b of the bolt at the connection thereof to the bolt shaft 26a, while constraining relative rotation between the bolt and the guide member about the bolt axis. By blocking rotation of the bolt, this cooperation of the straight-sided hole 30 and the straight-sided shoulder 26c of the bolt allows each clamping device to be tightened with only a single wrench or socket, because with the rounded head of the carriage bolt head held manually against the second leg 16b of the lower angle iron 16 of the first guide member while holding the first guide member in place, tool driven rotation of the nut 28 in the tightening direction will rotate the nut relative to the bolt shaft due to the rotation-prevention function effected on the bolt by the square hole.

Other arrangements for limiting or preventing rotation of one of the threaded bolt and nut members relative to the other may be employed to similarly allow single-tool tightening of the clamping mechanism. In one alternative option, the bolt is welded or otherwise fixed to one of the guide members in a non-rotational manner, while the nut remains freely rotatable. In another option, the nut is welded otherwise fixed to one of the guide members in a non-rotational manner, while the bolt remains freely rotatable. In another alternatively, the use of a nut is omitted, and is replaced with a threaded hole in the respective guide member into which a freely rotatable bolt can engage. In another embodiment, both the nut and bolt may be freely rotatable without any fixed attachment or rotation-constraining cooperation with the respective guide member, but then a pair of tools are required for optimal tightening of the clamping mechanism, one tool to drive rotation of either the nut or bolt while the other tool holds the other of the nut and bolt against such rotation.

With the jig now clamped in place on the post, manual support of the jig is no longer required. The slot length of the guide members exceeds the width of the workpiece measured between the two opposing sides 104a, 104b of the post 100 on which the guide members are not disposed, plus the width of the saw blade B as measured between the serrated cutting edge and opposing edge thereof. A reciprocating saw is used, as saws of this type are capable of using commercially available blades of sufficient length to cut through 4×4-inch and 6×6-inch posts, and so the blade length sufficiently exceeds the thickness of the post to allow cutting of the full post thickness in a single cutting pass. The slot length may for example be equal, or substantially equal, to the distance between the two carriage bolts 26 of the clamping mechanism, as is shown for the illustrated embodiment in which the center-to-center spacing of the carriage bolts matches that of the rivets 18, 20.

The two slots are automatically placed in substantial alignment with one another in the same plane due to minimization of the clearance for the carriage bolts through the aligned bolt openings 30, 32 in the guide members to an amount that is sufficient to avoid notable resistance to or interference to receipt of the bolt through the openings, while minimizing play between the bolt and the guide members so as to auto-align the two guide members with one another. With the parallel legs of two angle iron pieces defining the slot of each guide member, each slot thus follows a straight path over its length, which thus follows the same straight-line path of the matching slot defined by the other guide member on the opposing side of the post and spanning across the full width of the post. The matching shape of these paths across the post define a cutting plane P along which the saw blade is guided during use of the saw blade to cut into the post along these slots.

With reference to FIG. 3, the saw blade B is inserted fully through the slot of the first or second guide member, and onward through the slot of the other guide member, at a position outward from the post on one of the sides 104a, 104b thereof not occupied by the guide members. The blade is inserted in an orientation facing the cutting edge of the blade B toward the post 100. The saw blade is driven in a reciprocal fashion by the saw in a well-known manner, and the saw is displaced along the slot toward the opposing end thereof during such driven reciprocation of the blade so as to cut through the full thickness of the post. The first legs of each guide member forming the top and bottom boundary walls of the slot constrain any wandering of the blade to form a smooth, straight cut across the post during this process. Having cut through the post, the saw blade is then withdrawn back out of the two slots of the jig, and the saw is safely set aside. To remove the temporarily installed jig, the nuts 28 of the clamping mechanism are loosened to withdraw the clamping force of the guide members from the sides 102a, 102b of the post 100. Sufficiently loosened to a point returning the distance between the guide members to a size exceeding the respective dimension of the post, the jig can be withdrawn from the post by slipping it upwardly past the freshly cut top end of the trimmed post.

Using two guide members on opposing sides of the post optimizes the cut accuracy by guiding the blade at two distinct areas spaced apart therealong, thus best avoiding wander of the blade from a true plane, while the use of clamping mechanism that draws the two guide members together supports these members firmly in direct abutment with the post while accommodating a notable variation of post sizes due to the adjustable size of the space between the two members. Further expansion of the post sizes that can be accommodated by a particular jig can be provided by substituting a pair of longer carriage bolts.

Turning to FIG. 6, it will be appreciated that the same jig 10 can be used to make non-horizontal cuts, and angled cuts that are oblique to the longitudinal axis or sides of the post. To allow cuts of anywhere between 45° and 90° relative to the longitudinal axis L of the post 100, the length of the slot is greater than the required length for a 45° angle cut plus the width of the saw blade B. Accordingly, the slot length can be expressed as $L_S > W_B + W_P/\cos 45°$, where $W_B$ is the width of the blade and $W_P$ is the width of the post. FIG. 6 shows use of the guide members of the jig after marking of angled cut and reference lines C, R to form an angled top of the fence post with a continuous unidirectional slope from one side of the post to another. Angled installation of the guide members can also be used to a create a peaked top end of the post, by cutting half way through the post within the slots of the guide members from one side of the post, then removing the guide members and reinstalling them on the same sides of the post at the opposite angle. For example, one could cut half way through the post width with the guide members sloped upwardly from one side of the post toward the other at 45° to horizontal, and then remove and reinstall the guide members in a position of opposite slope angling upwardly from the other side of the post from which the other half of the post width is then cut.

FIG. 6 also illustrates temporary mounting of the jig to the post using means other than the clamping mechanism described above. A series of fastener holes 38 are spaced apart along the length of each guide member in the second leg 16b of the lower angle iron 16 thereof, between the bolt-receiving holes 30, 32 for the clamping mechanism. With the guide member manually held in the desired location according to the marked reference line R, a pair of screws 40 can be driven into the respective side of the post against which the guide member is placed via a selected pair of these fastener holes 38. With one guide member so installed, the other can then be fastened to the opposing side of the post using screws that are likewise driven through a selected pair of fastener holes in the second guide member. While a lesser or greater number of screws may be used, use of two or more screws is preferable to prevent inadvertent rotation of the guide member about the axis of a single-screw while cutting the post through the slots of the guide members. In the illustrated embodiment, wherein the width of the lower angle iron is notably less than its length, spacing a series of more than two fastener holes along the length of the guide member maximizes the amount of distance by which two screws can be separated to provide optimum resistance to rotation of the guide member. However, it will be appreciated that that slot-equipped guide members of alternate shape or construction may be used, and may feature a different layout of fastener holes.

When the post has been cut, the screws 40 are removed from the post in order to free the two guide members from the post. The jig of the illustrated embodiment, with both a clamping mechanism and additional fastener holes, gives the user the option of whether to clamp or screw the jig to the post. Other embodiments may lack multiple mounting solutions, and for example employ a clamping mechanism without additional fastener holes, or vice versa. While the illustrated embodiment employs a series of several fastener holes to provide more placement options than the minimum number of screws to be used, another embodiment may alternatively have only two fasteners holes placed. However, the larger series of holes prevents a better balance between the sizes of workpiece on which the jig can be used with the screw-mounted method, and the distance by which the screws can be spaced apart to better resist rotation of the guide member. While the illustrated embodiment employs screws for easy removal of the fasteners, other embodiments may employ nails, but this has more potential to damage of the post in order to pry out the nails when the guide members are to be removed.

Figure 7:
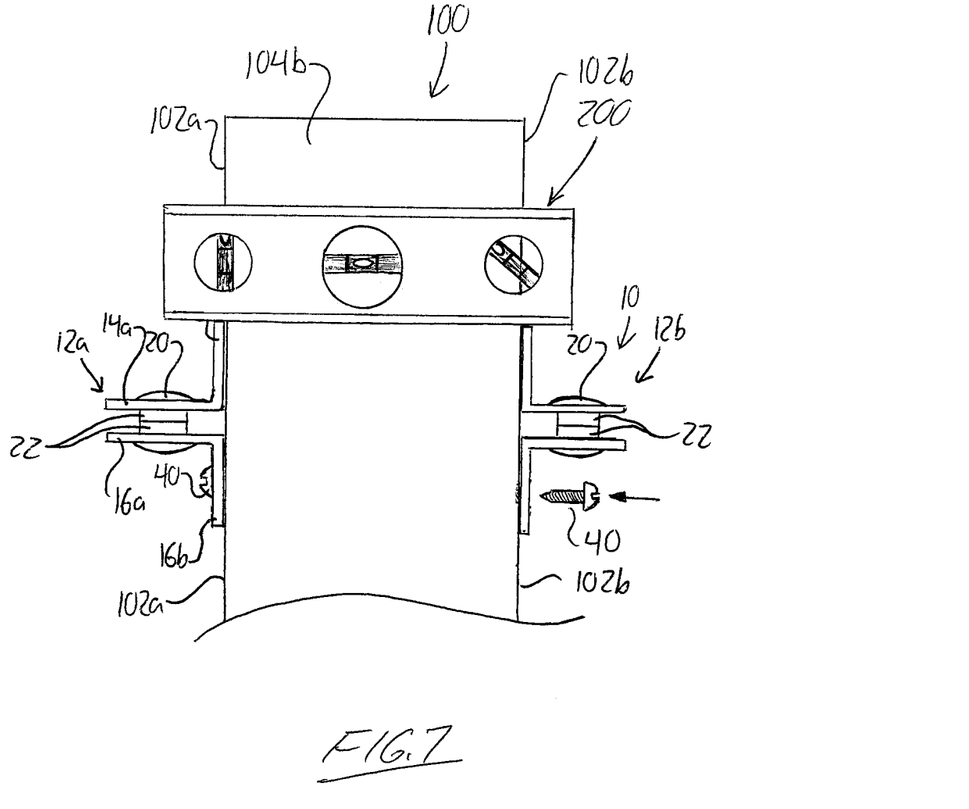
FIG. 7 is an end view similar to FIG. 5, but showing use of a level to aid in installation of the jig using the mounting option of FIG. 6.

In the embodiment of FIG. 6 in which the guide members are separately and individually fastened to the post a suitable reference line R, and optional cut line C, may be marked on each of the two sides of the post on which the guide members are to be installed. Alternatively, with reference to FIG. 7, easier installation may be achieved by marking one side of the post, installing the respective guide member, and then using a small leveling tool 200 held on the top edge of the top angle iron 14 of the first guide member at a location outward from the post to extend cross-wise from the first guide member and reach across the thickness of the post to the opposing side thereof, where the second guide member can be positioned by abutting the top of edge of its top angle iron up against the horizontally held level.

It will be appreciated that guide members of alternate form to the illustrated and described angle-iron construction described may be employed to provide slots of matching shape on opposing sides of a post or other elongate workpiece, the use of angle iron pieces provides a notable slot depth that exceeds the individual thickness of each of these pieces in any direction compared to use of a purely planar plate member for each guide member, as employed in some of the prior patents summarized in the foregoing background section herein. Such greater slot depth may improve the constraint of the saw blade to the slot-defined cutting path.

The illustrated embodiments, by using separate guide members individually fastened to or clamped together against opposing sides of the post are able to accommodate a large variety of post or workpiece sizes compared to prior art jigs of a closed four-sided structure of fixed dimension. In addition, another advantage of the disclosed jig is that it can be used in a wide variety of contexts, including various states of a project. For example, depending on the design of a fence being constructed, prior art jigs of closed, four sided design may only be usable on a fencepost prior to the assembly thereof with other components of the fence that would interfere with sliding of the jig downward over the top end of the fencepost.

For example, in a completed fence in which horizontal rails have been strung between the posts near the upper and lower ends thereof and vertical picket boards have been attached in upright positions spanning from the lower rails to the upper rails between the posts, the top ends of the posts above the top ends of the picket boards cannot be trimmed down to a height flush with the top of the picket boards with at least some of the prior art jigs. That is, the top ends of the picket boards would block sliding of the jig far enough down on the post to set the slot or guide edge of the prior art jig at an elevation even with the tops of the picket boards. However, the jig of the present invention can be clamped to the post in an inverted position that is flipped over relative the illustrated position in the figures, whereby the clamping mechanism and fastener holes would be positioned on the top angle irons of the guide members so as to reside above the slot rather, than below it. The jig could be slid down over the top of the post with the guide members on the opposing sides of the post that lie parallel to the plane of the rails and picket boards, whereby the bolts of the clamping mechanism would span over the top ends of the two picket boards that neighbor the post, and the slots of the guide members would lie flush with the top ends of the picket boards at an elevation shortly below that of the clamping mechanism. In such an instance, the top ends of the picket boards may be used to align the slots of the jig instead of using a reference line drawn on the post.

Accordingly, the illustrated jig of the present invention may be usable on a fence post prior to completion of the fence, at an intermediate stage of the fence construction, or as part of a final finishing step of the constructed fence. The jig could be even be used in a separate post-trimming operation performed any time after the construction of the fence, for example to improve the visual appearance of an existing fence, regardless of how long ago the fence was originally erected. Likewise, the jig can be used on workpieces other than fence posts, at a number of possible different stages relative to a construction process in which the workpiece is being, has been, or will be used.

Just as the forgoing example demonstrates that the jig may be used in an inverted position compared to that illustrated in the accompanying figures, it will likewise be appreciated that a reference line R offset from the cut line C for use in aligning the slots of the jig with the desired cutting plane P may be drawn at a position offset upwardly above the cut line C, instead of downwardly below the cut line. In such an instance, it is the distal top edge of the upper angle iron that is aligned with the reference line R, and not the lower distal edge of the bottom angle iron.

Since various modifications can be made in my invention as herein above described, and many apparently widely different embodiments of same made within the scope of the claims without departure from such scope, it is intended that all matter contained in the accompanying specification shall be interpreted as illustrative only and not in a limiting sense.

The invention claimed is:

1. A jig for use in cutting an elongate workpiece with a saw blade, the jig comprising:
   a first guide member;
   a second guide member that is separate from said first guide member;
   each of the guide members being substantially defined by a respective pair of right angle pieces with first legs of the right angle pieces facing one another in parallel relation in order to define a slot therebetween that passes through said guide member on a path spanning along a lengthwise dimension thereof, and with second legs of the right angle pieces lying in coplanar relationship with one another to define a flat inner side of the guide member that faces toward the other guide member;
   a screw-type clamping mechanism comprising:
      two pairs of aligned bolt holes passing through the second legs of the right angle pieces of the guide members, with each of the two pairs of aligned bolt holes featuring a respective hole in one of the right angle pieces of each of the guide members at a location adjacent a respective end of the slot of said guide member;
      a pair of bolts each positioned or positionable to place a threaded shaft of the bolt in a position passing through a respective one of the two pairs of aligned bolt holes; and
      a pair of threaded nuts that are each engaged or engagable on a respective one of the bolts and tightenable against the second leg of one of the right angle pieces through which the respective one of the two pairs of aligned bolt holes passes on an outer side of said second leg that faces away from the other one of the right angle pieces through which the respective one of the two pairs of aligned bolt holes passes, whereby the threaded nuts are tightenable on the pair of bolts to force the first and second guide members toward one another;
   whereby tightening of the threaded nuts on the pair of bolts with the first and second guide members disposed on opposing sides of the workpiece acts to clamp the flat inner sides of the first and second guide members flat against the workpiece from the opposing sides thereof to enable cross-wise cutting of the workpiece by insertion of the saw blade through the respective slots on the opposing sides of the workpiece and cutting into the workpiece along the path of said slots.

2. The jig of claim 1 wherein the first and second right angle pieces of each of the guide members are fixed together in a non-movable relationship with one another.

3. The jig of claim 1 wherein the first and second right angle pieces of each of the guide members are welded to one another.

4. The jig of claim 1 wherein the first and second right angle pieces of each of the guide members are riveted to one another.

5. The jig of claim 1 wherein the second legs of the respective pair of right angle pieces of each of the guide members define an entire side of said guide member that faces the workpiece when clamped thereagainst.

6. The jig claim 1 wherein an entire side of each of the guide members that faces the workpiece when clamped thereagainst is defined solely by the flat surface that is defined by the second legs of the respective pair of right angle pieces.

7. The jig of claim 1 wherein each of the first and second guide members consists solely of the respective pair of right angle pieces and attachments made between said respective pair of right angle pieces at locations adjacent opposing ends thereof.

8. The jig of any claim 7 wherein said attachments made between the right angle pieces of each of the guide members consist of only two attachments, each of which is located adjacent a respective end of the slot, which is void of any other components between said two attachments.

9. The jig of claim 7 wherein said attachments are identical to one another.

10. The jig of claim 7 wherein each of the attachments is a respective weld.

11. The jig of claim 1 wherein each of the right angle pieces comprises a respective piece of angle iron.

12. The jig of claim 11 wherein each of the right angle pieces consists solely of said respective piece of angle iron.

13. The jig of claim 1 wherein each of the bolts comprises a shouldered area beneath a head of the bolt and a respective one of the respective pair of aligned bolt holes is shaped for receipt of said shouldered area in a manner constraining rotation of the bolt by blocking rotation of said shouldered area.

14. The jig of claim 1 further comprising an at least one fastener hole in at least one of the right angle pieces of each of the guide members for engagement of at least one fastener through said at least one of the right angle pieces and into the workpiece for individual fastening of each of the guide members to the workpiece instead of clamping of the guide members to the workpiece with the screw-type clamping mechanism.

15. The jig of claim 14 wherein the at least one fastener hole of each of the guide members comprises at least two fastener holes spaced apart along the lengthwise dimension of the guide member.

16. The jig of claim 14 wherein each of the fastener holes is smaller than the bolt holes.

17. The jig of claim 1 in combination with the workpiece, wherein a length of the slots in the guide members exceeds a value of $W_B + W_P/\cos 45°$, where $W_B$ is a width of the cutting blade and $W_P$ is the width of the elongated workpiece, whereby the guide members can be placed with the slots at any angle between 45° and 90° relative to a longitudinal axis of the elongated workpiece while enabling a cut fully through the workpiece.

* * * * *

UNITED STATES PATENT AND TRADEMARK OFFICE
CERTIFICATE OF CORRECTION

| | | |
|---|---|---|
| PATENT NO. | : 8,950,307 B1 | Page 1 of 1 |
| APPLICATION NO. | : 14/294288 | |
| DATED | : February 10, 2015 | |
| INVENTOR(S) | : Timothy G. Harlos and Leonard M. Rivers | |

It is certified that error appears in the above-identified patent and that said Letters Patent is hereby corrected as shown below:

Title Page insert -- (30) Foreign Application Priority Data November 6, 2013 (CA) 2832314 --

Signed and Sealed this
Twelfth Day of January, 2016

Michelle K. Lee
*Director of the United States Patent and Trademark Office*